United States Patent
Ouvrier-Buffet et al.

(10) Patent No.: US 7,544,942 B2
(45) Date of Patent: Jun. 9, 2009

(54) THERMAL DETECTOR FOR ELECTROMAGNETIC RADIATION AND INFRARED DETECTION DEVICE USING SUCH DETECTORS

(75) Inventors: Jean-Louis Ouvrier-Buffet, Sevrier (FR); Agnès Arnaud, Saint Jean le Vieux (FR); Sylvette Bisotto, Grenoble (FR); André Perez, Cordeac (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 11/877,909

(22) Filed: Oct. 24, 2007

(65) Prior Publication Data
US 2008/0265164 A1 Oct. 30, 2008

Related U.S. Application Data

(63) Continuation of application No. PCT/FR2006/050378, filed on Apr. 24, 2006.

(30) Foreign Application Priority Data

May 12, 2005 (FR) ................................... 05 51244
May 12, 2005 (FR) ................................... 05 51245

(51) Int. Cl.
*H01L 27/14* (2006.01)
*G01J 5/00* (2006.01)

(52) U.S. Cl. .................................. 250/338.4; 250/338.1

(58) Field of Classification Search .............. 250/338.1, 250/332, 338.4, 339.02; 257/E31.093
See application file for complete search history.

(56) References Cited

U.S. PATENT DOCUMENTS

| 5,688,699 A * | 11/1997 | Cunningham et al. ......... 438/54 |
| 5,912,464 A | 6/1999 | Vilain et al. |
| 6,201,243 B1 * | 3/2001 | Jerominek .............. 250/338.1 |

FOREIGN PATENT DOCUMENTS

KR WO 00/37906 A1 6/2000

* cited by examiner

*Primary Examiner*—David P Porta
*Assistant Examiner*—Faye Boosalis
(74) *Attorney, Agent, or Firm*—Burr & Brown

(57) ABSTRACT

A thermal detector comprising a sensitive material having at least one electrical property of which varies with temperature; an electromagnetic radiation absorber which is in contact with the sensitive material; a substrate providing the function of support; and electrically conductive elements providing electrical continuity between sensitive material and substrate. The sensitive material is wholly or partly in the form of a sheet extending in a direction which is essentially perpendicular to the plane of the substrate. The sensitive material is suspended above the substrate by the absorber which is fixed to the sensitive material in the upper region of the sheet. The absorber is suspended by fixing means which is mechanically connected to the substrate.

17 Claims, 7 Drawing Sheets

PRIOR ART

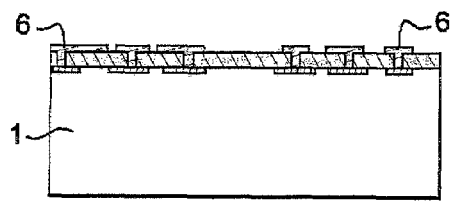
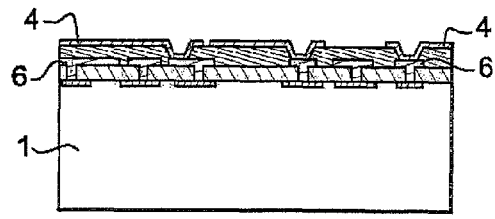
Fig. 6A                Fig. 6B
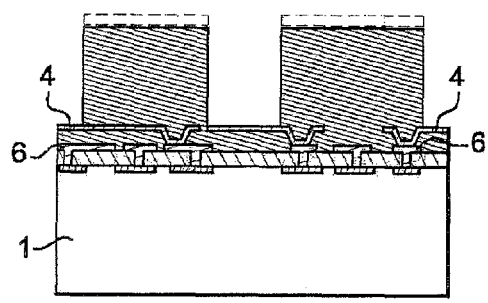
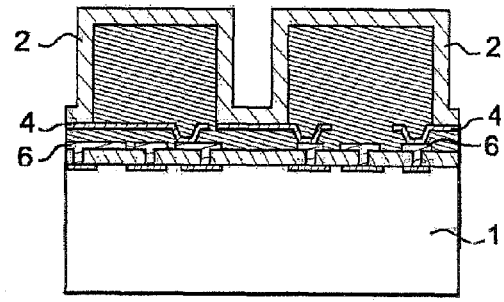
Fig. 6C                Fig. 6D
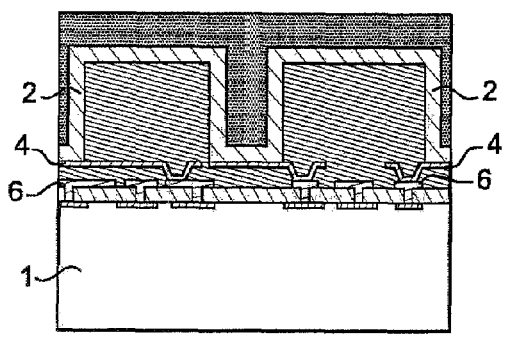
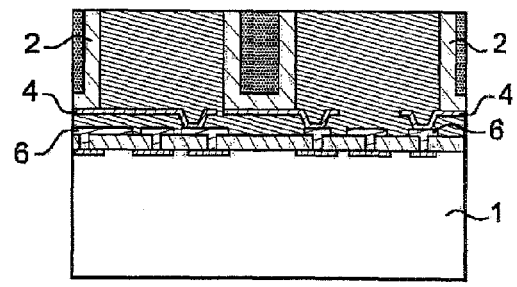
Fig. 6E                Fig. 6F

THERMAL DETECTOR FOR ELECTROMAGNETIC RADIATION AND INFRARED DETECTION DEVICE USING SUCH DETECTORS

FIELD OF THE INVENTION

The present invention relates to a thermal detector, especially a bolometric detector, as well as to an infrared detection device which uses such detectors.

The application area of the invention is infrared imaging in particular.

BACKGROUND OF THE INVENTION

By definition, a thermal detector is used to measure the amount of incident radiant flux, for example the power of electromagnetic radiation in the infrared ray region.

As far as infrared detectors are concerned, devices designed in the form of an array which are capable of operating at ambient temperature, i.e. which do not require cooling, are known—these are contrasted with detection devices referred to as "quantum" detectors which can only operate at extremely low temperature, typically at the temperature of liquid nitrogen.

These detectors generally comprise a sensing element which can be warmed by infrared radiation which is characteristic of the temperature and emissivity of observed bodies. An increase in the temperature of the sensing element produces a variation in an electrical property of the sensitive material: build-up of electric charges due to the pyroelectric effect, variation in capacity due to change in the electric constant or, more traditionally, variation in the resistance of a semiconductor or metallic material.

In the latter case, one refers to a resistive bolometric detector. The absorbed incident radiation causes a rise in the temperature of the detector which causes variation in electrical resistance. These variations in resistance produce variations in the voltage or current across the terminals of the detector which constitute the signal output by the sensor.

Such an uncooled detector is generally associated with:
means of absorbing the infrared radiation and converting it into heat;
means of thermally isolating the detector so that its temperature can rise due to the effect of the infrared radiation;
thermometric means which, traditionally, use a resistance element;
means of reading electrical signals provided by the thermometric means.

Detectors intended for infrared imaging are produced as a one- or two-dimensional array of elementary detectors on a substrate generally made of silicon which incorporates means of electrically exciting (stimulating) said elementary detectors and means of pre-processing the electrical signals generated by these elementary detectors.

These means of electrical excitation and pre-processing are formed on the substrate and constitute a readout circuit.

In practice, monolithic infrared imaging devices operating at ambient temperature are fabricated by directly connecting an array of sensing elements to a CMOS or CDD type silicon multiplexing circuit.

A device comprising an array of elementary detectors and an associated readout circuit is generally placed in a package and connected, especially electrically, to its external environment using classic techniques (metal wires and pins). The pressure inside such a package is reduced in order to limit thermal losses. The thermal detector can thus be encapsulated in a vacuum or a gas which is a relatively poor conductor of heat in order to obtain improved performance. The package also has a window that is transparent to the radiation to be detected.

In order to observe a scene using this detector, the scene is projected through suitable optics onto the array of elementary detectors and clocked electrical stimuli are applied via the readout circuit (provided for this purpose) to each of the elementary detectors or to each row of such detectors in order to obtain an electrical signal that constitutes an image of the temperature reached by each elementary detector.

This signal is then processed to a greater or lesser extent by the readout circuit and then, if applicable, by an electronic device outside the package in order to generate a thermal image of the observed scene.

The performance of uncooled bolometric detectors is, however, largely dependent on mastering the fabrication and integration of extremely high-performance bolometric materials into very lightweight structures consisting of bolometer micro-bridges that are thermally isolated from the readout circuit in order to exploit the latter to the full in terms of the signal-to-noise ratio.

Detectors such as these which are capable of offering high performance therefore demand, in particular at the level of the sensitive material, good thermal isolation of the active layer from its support as well as a sensitive material which is highly sensitive to the effect used to convert a rise in temperature into an electrical signal. The first two conditions are met by thin-film implementation.

The prior state of the art describes various ways of arranging the various components of the elementary detectors. A classic layout is shown in FIG. 1 in relation to a bolometer.

Schematically, this type of detector is built in the form of a membrane suspended above substrate (1) acting as a support and fixed to the substrate by anchoring points (5) referred to as "posts" which conduct electricity. This membrane comprises a thin film (typically 0.1 to 1 µm) of temperature-sensitive bolometric material (2), two coplanar or parallel electrodes (not shown) and absorber (3).

The term "absorber" denotes one or more layers or arrangements of layers, the function of which is to capture electromagnetic radiation in order to convert it into heat and to transfer its temperature to thin film (2) which acts as a thermometer.

The prior state of the art makes provision for various thermometers (2), including the thermistor which is one widely-used option. In particular, many documents and publications describe various bolometric structures based on a semiconductor material.

The sensitive material can thus be made of slightly or highly resistive p-type or n-type polycrystalline or amorphous silicon. It may also be made of vanadium oxide ($VO_x$) made in a semiconducting phase.

Generally speaking, the sensitive material rests on an insulating support ($SiO_2$, SiO, SiN, etc.) which ensures the bolometric structure is mechanically rigid. It can also be completely encapsulated using one of these insulating materials.

Support substrate (1) typically consists of an integrated electronic circuit on a silicon wafer comprising, firstly, devices for driving and reading the thermometer and, secondly, multiplexing components which male it possible to serialise the signals obtained from the various thermometers and send them to a reduced number of outputs so that they can be analysed by a conventional imaging system. The circuit can be located underneath the detector or be located further away on the substrate. This circuit may also amount to an interconnection network, the function of which is to link the electrical outputs of the detector to an information-processing circuit located elsewhere.

Electrical interconnection between thermometer (2) and the read components located on substrate (1) is ensured by a layer, generally a metallic layer, which is placed on the thermal isolation devices described below.

The sensitivity of the thermal detector is known to be improved by introducing isolating "arms" (8) between support substrate (1) and membrane (3) which are designed to limit the thermal losses of the membrane, thus maintaining the rise in the temperature of the membrane. These flat, elongated and very narrow structures consist of layers which are as thin as possible, they must also be electrically conductive but thermally resistive.

In this type of device, the readout circuit applies, via posts (5) and arms (8) and at least two conductive parts or electrodes (not shown), an electric current which flows through the structure parallel to the plane of the bolometric detector. This current then flows through bolometric material (2), the resistivity of which varies with temperature.

In the embodiment described, the isolation devices are located in the same plane as the layer of biometric material or are produced underneath the latter. When implemented in the plane of the bolometric plate, this system of arms has a deleterious effect in terms of the fill factor of the pixel or elementary detector. Experience shows that it is not possible to significantly increase the length of arms (8) or reduce their width and/or thickness without affecting the rigidity of the structure. In fact, these elements are a mechanical weak point which affects the stability of the micro-bridges which may pivot or deform and therefore come into contact with the substrate, thus adversely affecting thermal isolation and consequently significantly impairing the performance of the detector.

Moreover, one of the layers that constitute these thermal isolation devices is generally an electrically conductive layer, the function of which is to ensure electrical connection between the detector and the readout circuit. Reducing the width and/or thickness of these elements results in increased electrical resistance when accessing the detector and, if this resistance is too high, this adversely affects optimal biasing of the detector.

In addition, the materials used to produce these electrically conductive layers are also good thermal conductors. The presence of this layer in the thermal isolation devices can therefore significantly degrade their thermal isolation and consequently degrade the performance of the detector.

The technical problem which the present invention aims to solve is therefore to propose an alternative arrangement of thermal detectors, especially bolometers, capable of ensuring satisfactory electrical connection while improving the thermal isolation of the bolometric material.

SUMMARY OF THE INVENTION

According to the invention, the thermal detector comprises:
a sensitive material, one electrical property of which varies with temperature;
an electromagnetic radiation absorber which is in contact with said sensitive material;
a substrate providing the function of support for the detector; and
electrically conductive elements providing electrical continuity between the sensitive material and the substrate.

The thermal detector according to the invention is distinctive in that the sensitive material is in the form of a sheet which extends wholly or partly in a direction which is substantially perpendicular to the plane that bounds the substrate and in that said material is suspended by the absorber above the substrate, said absorber being fixed to the sensitive material in the upper region of the sheet and in that the absorber is itself suspended by a fixing means which is mechanically connected to said substrate.

Advantageously, the fixing means is electrically conductive and is consequently mechanically and electrically connected to the substrate.

Thus, the proposed solution is based on the special layout of the sensitive material rather than on optimizing the dimensional features of the arms: the sensitive material is placed at right angles to the surface of the support rather than parallel to the surface of the support.

As a result, the electric current in the bolometric material flows exclusively at right angles to the surface of the support. This way, almost the entire surface is freed up, thereby malting it possible to optimize optical absorption and thermal isolation. What is more, this configuration, which is highly suitable for achieving reduced pitch spacing, makes it possible to produce thermal isolation arms at two different levels, thus providing an additional degree of freedom when designing the detector. The fill factor thus obtained is ideal from the point of view of absorption of infrared radiation. This approach is also very favorable in terms of thermal mass because all the thermometric material is active thanks to the contact established on the sheet of this material. What is more, the thermometric material is absent from almost the entire surface of the cavity which then becomes a true Fabry-Perrot cavity which can be adjusted to exactly one quarter of the wavelength to be detected, thus enhancing detection performance in a known way.

Such a layout therefore males it possible to improve the thermal isolation properties of the bolometer without adversely affecting the stability of the micro-bridges. In addition, the proposed solution results in an ideal fill factor.

The invention relates more particularly to bolometric thermal detectors, the sensitive material of which exhibits temperature-dependent resistivity. Such bolometric materials are preferably semiconductor materials selected from the following group: p- or n-type polycrystalline or amorphous silicon, p- or n-type polycrystalline or amorphous germanium, alloys thereof, vanadium oxides and ferrites:

In one preferred embodiment, the absorber is in the form of a preferably thin layer located in a plane substantially parallel to that of the substrate.

Because of the constraints mentioned above, the sensitive material is preferably formed from a single thin layer designed to have a continuous or discontinuous cylindrical surface, the base of which is advantageously square, rectangular, cylindrical or hexagonal.

In a known manner, in order to improve the performance of the device, the latter comprises a layer which reflects electromagnetic radiation, is electrically conductive and is located in a plane substantially parallel to the absorber.

In a first embodiment, electrical continuity between the sensitive material, which is in contact with lower electrodes, and the substrate or the metallic layer, if there is one, is ensured by means of mechanical or electrical connections.

In the case in question, the means of fixing the absorber above the substrate has a mechanical function and acts as an electrical conductor and consists of an electrically conductive post arranged at right angles relative to the plane which bounds the substrate, there being electrical continuity between the top of the post and the absorber.

Alternatively and in a second embodiment, some of the conductive elements are directly attached to the sensitive material and these conductive elements are capacitively coupled to other conductive elements which are directly attached to the substrate.

Thus, this solution involves eliminating any physical continuity of the electrical conductor in the retention and thermal isolation devices of the thermal material, especially bolometric material, and obtaining an electrical connection between the detector and the readout circuit by capacitive coupling.

In such a device, thermal losses due to conduction by the electrical conductor are eliminated completely. At the same time, the stability of the micro-bridges and the fill factor of the detector are not affected and biasing of the detector is facilitated.

In terms of principle, there is an upper conductive part which is in contact with the sensitive material and a lower conductive part which is in contact with the substrate and these two conductive parts form a capacitor which allows electrical transmission between the readout circuit and the active detection area which has variable resistance in the case of a bolometer. Depending on the various embodiments, this upper or lower electrode function, referred to as a "capacitor plate", can be fulfilled by separate components of the device. These conductive parts can also be involved in securing the structure.

In practice, capacitive coupling is ensured between the conductive parts attached to the sensitive material in the lower area of the sheet and the conductive parts in the form of a metallic layer which reflects electromagnetic radiation, conducts electricity and covers the substrate.

Two embodiments are compatible with electrical connection obtained by capacitive coupling. The fixing means used to suspend the absorber above the substrate can be an electrical conductor which is mechanically and electrically connected to the substrate. Alternatively, this fixing means can be an electrical insulator which is only mechanically connected to the substrate. In both cases, the means of fixing the absorber above the substrate advantageously consists of a post arranged at right angles relative to the plane which bounds the substrate, there being electrical continuity between the top of the post and the absorber.

In one particular embodiment and regardless of the type of electrical connection, the detector according to the invention consists of a p/n or an n/p junction.

During the process to fabricate a thermal detector according to the invention, a metallic compensating mask having a surface area equal to that of the top of the post is inserted between the top of said post and the absorber.

One or more thermal detectors according to the invention are used in a bolometric device for detecting infrared radiation which preferably has an array architecture.

Such a device also advantageously comprises a reference or compensation thermal detector which is also referred to as a "baseline resistor" in the context of bolometers. The latter does not have the ability to detect electromagnetic radiation but is otherwise identical to the active thermal detector in every respect. In practice, this is achieved by using a metallic post having a top which entirely covers the surface of the absorber as a fixing means, thus preventing any detection of electromagnetic radiation and also ensuring effective thermal coupling with the substrate.

BRIEF DESCRIPTION OF THE DRAWINGS

The way in which the invention can be implemented and its resulting advantages will be made more readily understandable by the descriptions of the following embodiments, given merely by way of example, reference being made to the accompanying drawings.

DETAILED DESCRIPTION OF THE INVENTION

Figure 1A:
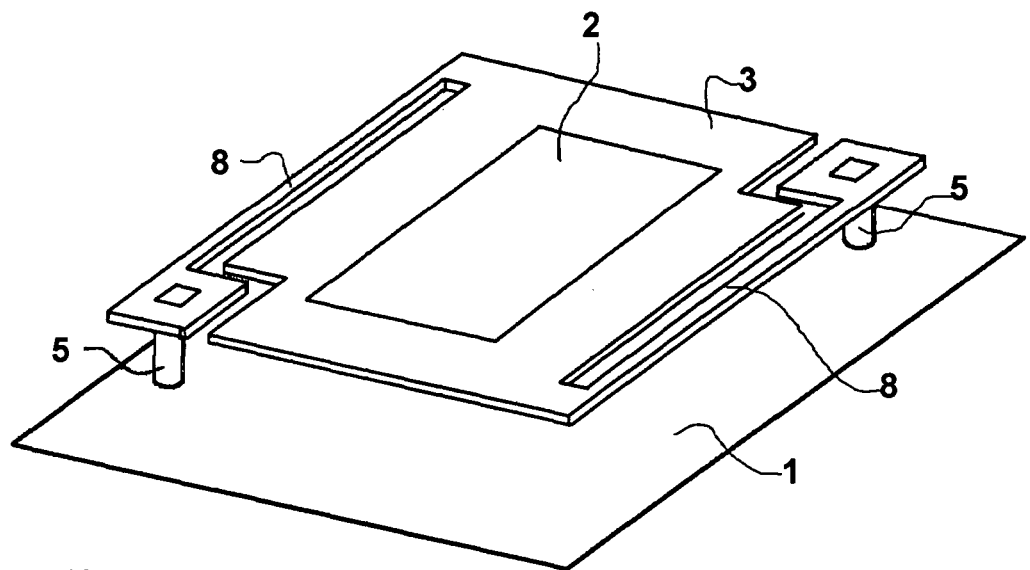
FIG. 1 is a perspective view (FIG. 1A) and plan view (FIG. 1B) of an elementary detector for electromagnetic radiation based on the principle of thermal detection in accordance with the prior art.
Figure 1B:
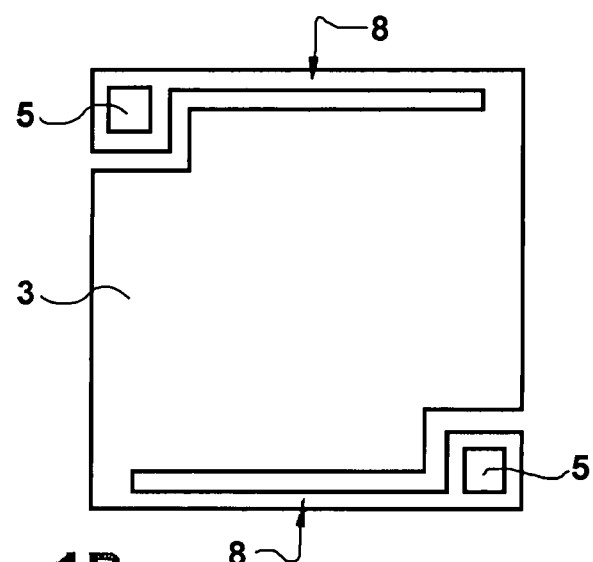

The invention therefore relates to an elementary thermal detector and, more especially, the layout of the sensitive material of this detector which is its distinctive feature compared with a bolometer according to the prior art, as shown in FIG. 1.

Figures 2A, 2B:
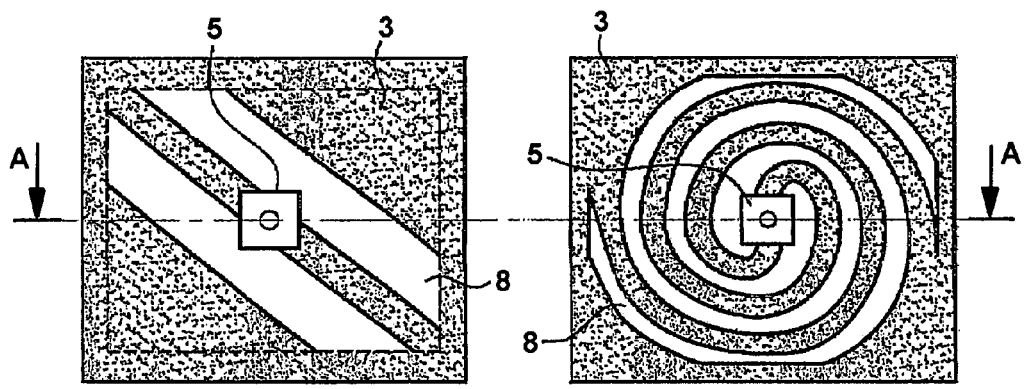
FIG. 2 is a schematic plan view of an active detector according to the present invention showing two embodiments (FIG. 2A and FIG. 2B).
Figure 3:
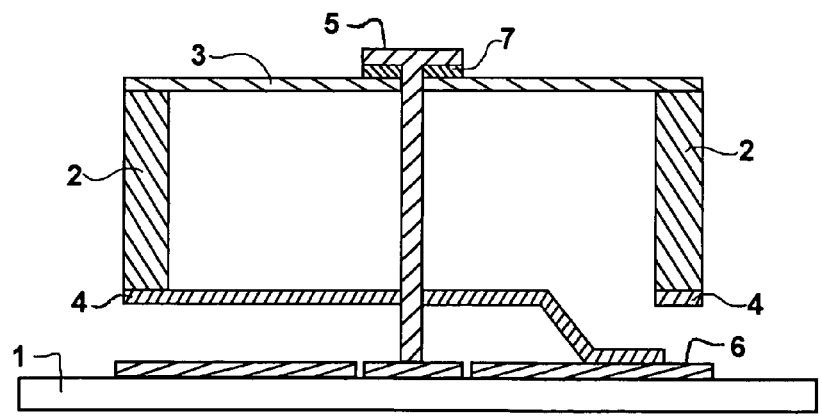
FIG. 3 is a cross-sectional view along line A-A in FIGS. 2A and 2B.

An active detector which uses a resistive bolometer according to the invention is described in greater detail, reference being made to FIGS. 2 and 3.

Such a bolometer is produced on a substrate (1) which incorporates an integrated readout circuit. On this substrate there is a metallic layer (6) which is used both to reflect incident infrared radiation and to electrically connect the bolometer.

On this metallic layer (6) which is applied using conventional photolithographic methods, a first sacrificial layer of 0.2 μm to 0.5 μm is temporarily used as a support for conductive film (4) (extremely thin in order to limit thermal losses) which, once defined, ensures a lower contact or a lower electrode of the thermometer. A second sacrificial layer of 2 μm to 2.3 μm is used to build bolometric structure (2), especially to produce the thermometer in its thickness by means of a cut which opens out on lower conductive material (4). After it has been deposited, thermometric material (2) must be removed from the surface parallel to substrate (1) by mechanical chemical polishing for example.

On completion of this operation, central post (5) designed to mechanically support bolometric material (2) above the substrate must be produced. This starts by depositing a layer of an absorbing material (3) and compensating mask (7)

The absorption of photons or electromagnetic radiation requires an absorber (3). This absorber is in the form of a metallic layer. This makes it possible to adjust the impedance between the vacuum and the cavity formed by this metallic layer (3) and reflector (6) which are separated by a distance equal to one quarter or substantially one quarter of the wavelength of the wave to be detected. This is generally a thin layer (30 to 100 Å) of titanium nitride for example.

Compensating mask (7) makes it possible to etch the sacrificial layer in order to produce central post (5) and then separate the detectors (especially etching the thermometric material in the bottom of the cuts). After eliminating compensating mask (7) from the region intended to absorb radiation, a final masking level defines absorber (3) and thermal isolation arms which secure detector (8). The shape of the isolation arms at the upper and lower levels is shown for information only in FIG. 2. This shape can be two interleaved spirals (FIG. 2B) for example.

FIG. 3 explicitly shows the detector according to the invention. Basically, it is characterised by the fact that bolometric material (2) extends in a plane perpendicular to the substrate and is hence not directly exposed to the incident radiation to be detected.

Said bolometric material is suspended above the substrate at least by absorber (3) which extends parallel to the substrate and is hence fully capable of receiving the incident radiation to be detected and thus transferring the quantity of heat collected to the bolometric material.

In the context of implementing a thermal detector according to the invention in a bolometric device for detecting infrared radiation, it is advantageous to use a compensation or reference bolometer, also referred to as a "baseline resistor".

In order to increase readout sensitivity, it is useful to shunt out the non-variable portion of the current in a so-called "baselining" branch of the circuit so that only the variable portion of the current is applied to the integrator.

Figure 4:
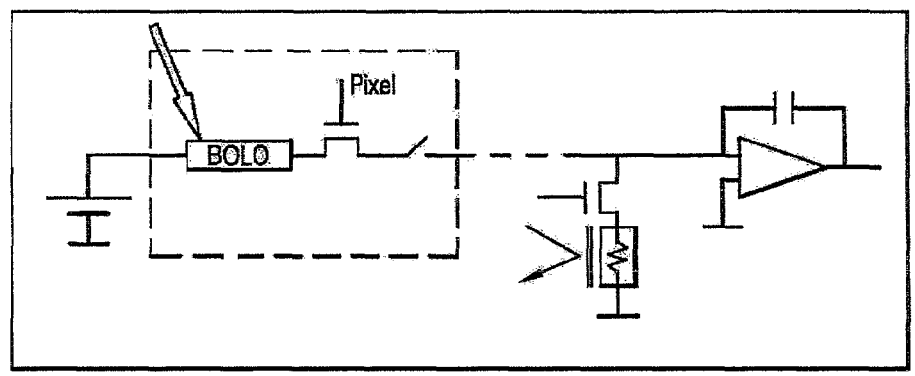
FIG. 4 schematically shows the principle used to sense the current of the bolometer.

This involves measuring the value of the resistance of the thermometric material represented by resistor BOLO in FIG. 4. The numerous ways of making this measurement include current sensing which is frequently used.

The device which performs the baselining function must generate little noise. To achieve this, baselining is achieved using a sufficiently high forward-biased resistance.

One classic solution is to use a thermal detector consisting of the same sensitive material (2) as the active thermal detector as a baselining resistance, preferably thermalized at the temperature of the focal plane, but not capable of detection.

Generally speaking, these elements are located at the end of a row or a column in order to save space. If the temperature of the focal plane fluctuates, the baselining resistances also regulate this effect because the way in which they change with temperature is identical to that of the active detectors.

The effectiveness of this baselining function is directly related to the characteristics of the baseline resistances. They must firstly have minimal thermal resistance in order to track the temperature of the focal plane as quickly as possible (thermalization) and they must secondly be blind in situations where blooming occurs, i.e. very high luminous fluxes which then saturate the electronic circuit.

The object of the invention also relates to improving these two characteristics. In fact, in FIG. 5, the top of post (5) extends over the entire surface area of pixel (3), thus ensuring all the infrared radiation is reflected and optimum thermalization thanks to the thick metallic layers that constitute post (5).

Figure 7:
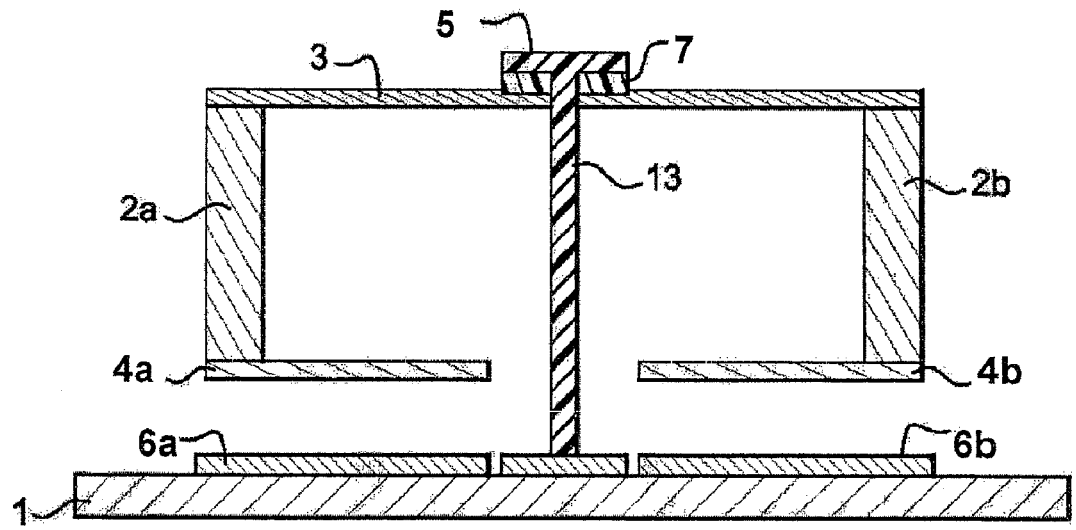
FIG. 7 is a schematic cross-sectional view of a bolometer with a vertical thermometer without any connection between the substrate and the lower electrodes.
Figure 8:
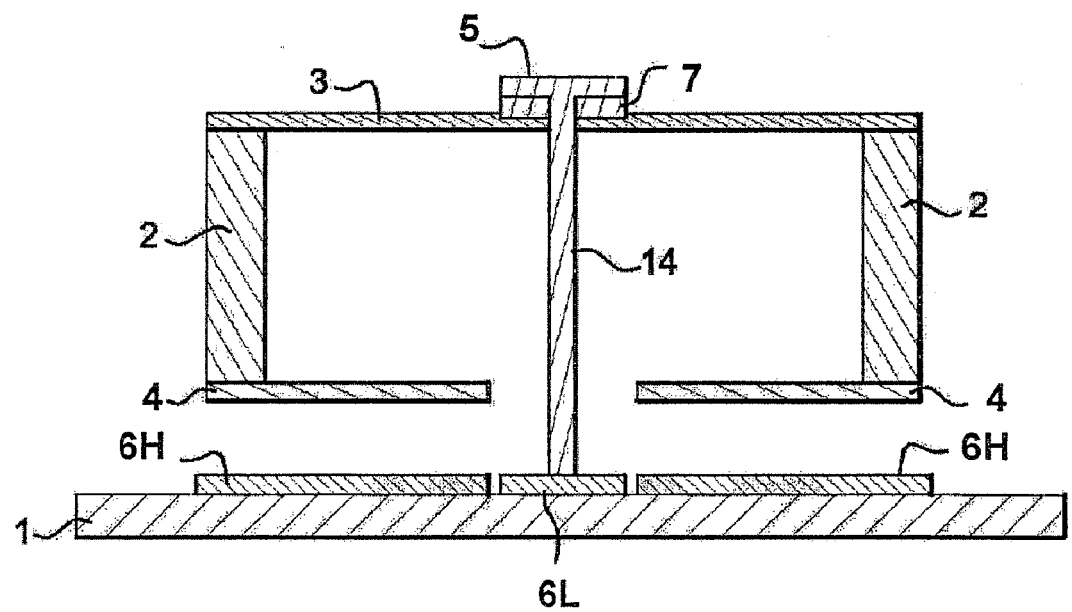
FIG. 8 is a view, similar to FIG. 7, of an alternative version of the embodiment that uses capacitive coupling.

In an alternative embodiment shown in FIGS. 7 and 8, the lower mechanical and electrical connections are eliminated so as to substantially increase the thermal resistance of the detector.

In this particular embodiment of the invention, the value of the resistance temperature detector is read by capacitively coupling lower electrode (4) of the bolometer with an electrode located on readout circuit (1).

Absorber (3) is suspended above substrate (1) by fixing mains (5) which is advantageously in the form of a central post (13, 14) that is mechanically connected to substrate (1).

In a first variation (FIG. 7), post (13) is an electrical insulator. Bolometric material (2) and electrodes (4) then consist of two electrically insulated parts, (2a, 2b) and (4a, 4b) respectively.

Capacitive coupling in accordance with the invention is established between electrodes (4a, 4b) which are attached to the lower sheet of bolometric material (2) and a metallic layer (6) produced on the substrate which is used as both a reflector for incident infrared radiation and to allow electrical connection of the bolometer.

The value of the resistance temperature detector is therefore read by capacitively coupling lower electrode (4a, 4b) of microbolometer (2) with electrode (6) located on the substrate of readout circuit (1). The current from electrode (4a), having passed through resistance temperature detector (2a), flows through upper electrode (3), then second part (2b) of the bolometer to second part (4b) of the lower electrode. One can determine the readout between electrodes (6a) and (6b) by capacitive coupling between electrode (4a) and electrode (6a) on the one hand and between electrode (4b) and electrode (6b) on the other hand.

In this embodiment, electrodes (6a) and (6b) therefore constitute points H and L of the electrical circuit of the detector between which the variation in the above-mentioned voltage is measured or sensed.

In the variation in FIG. 8, post (14) is the electrical conductor. The sensitive material is then continuous and constitutes a single part. Consequently, electrode (6) is also unique.

The electric current from electrode (4), having passed through bolometric material (2), flows through upper electrode (3) and then flows back down post (14) as far as base (6L) which is attached to substrate (1). There is capacitive coupling between electrode (4) and electrode (6H), which is also unique. The current is measured between points H and L.

This solution has an obvious and decisive advantage in terms of preventing thermal losses and allowing optimized biasing compared with detectors according to the prior art. This being so, the performance of detection devices which use such detectors is drastically improved.

Figure 5:
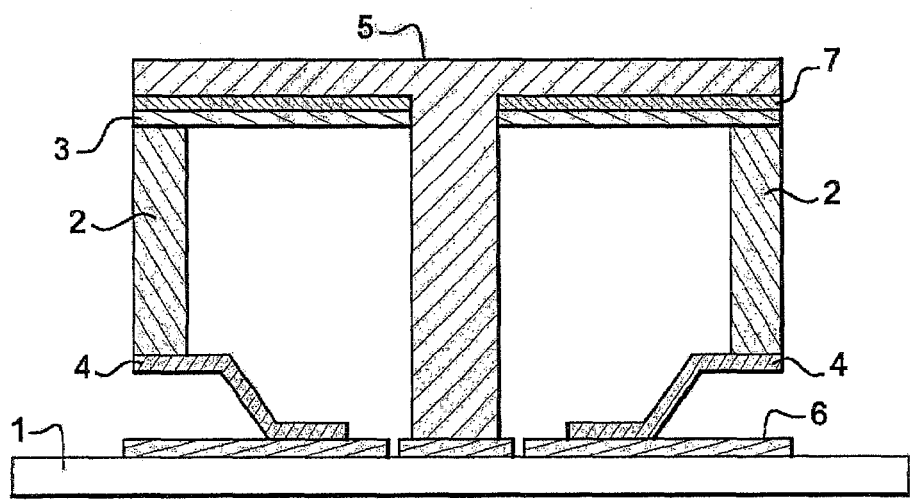
FIG. 5 is a schematic cross-sectional view of the baseline resistor.

In this configuration, the reference bolometer that is used, is prepared adopting the same principle as that for the baseline resistance shown in relation to FIG. 5.

Figure 9:
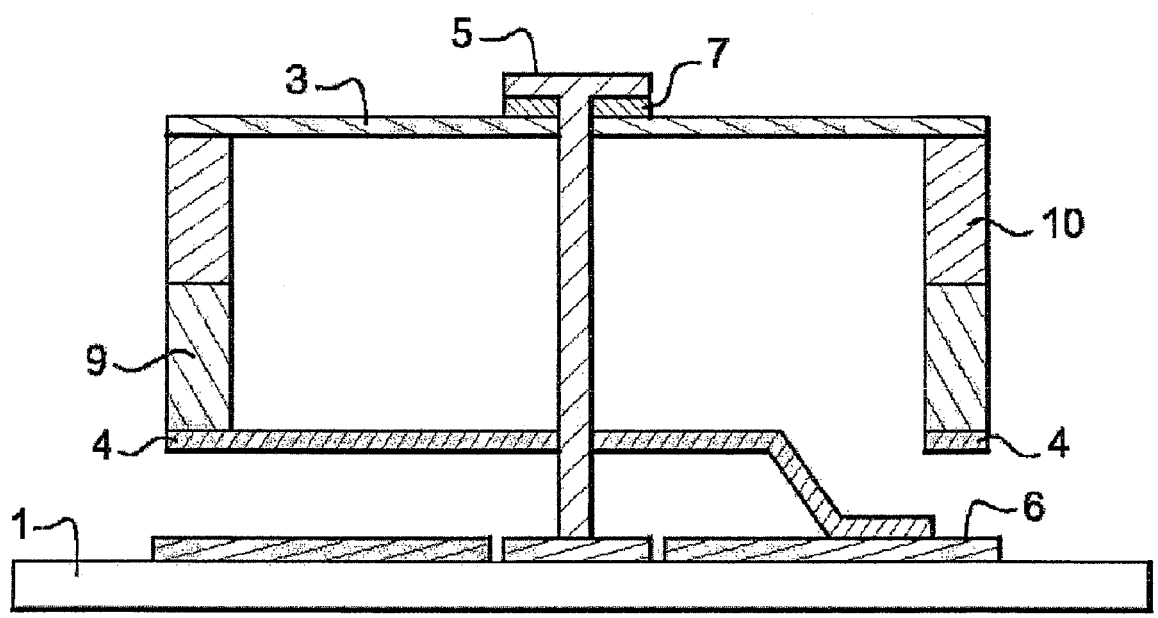
FIG. 9 is a schematic cross-sectional view of a thermal detector with a vertical p/n or n/p junction.

According to the invention, a p/n or n/p diode or junction (9, 10) operating in forward mode may also be suitable for a thermal detection application as shown in FIG. 9. This junction can be obtained by inverting, for example, the type of material deposited by ion implantation or by diffusing a dopant to a suitable depth.

The so-called "vertical" configuration of the invention is perfect for producing a high-performance detector by limiting the excess noise introduced by the series resistance of the detector which, in this configuration, is reduced enormously.

The corresponding baseline detector with a vertical junction is prepared using the principle described in FIG. 5. It consists of p- and n-type regions. This option may, if necessary, be combined with the capacitive coupling described and illustrated above in FIGS. 7 and 8.

FIG. 6 shows an example of the various stages involved in fabricating a bolometric device for detecting infrared radiation which incorporates a bolometer and a baseline resistance in accordance with the invention and in which the bolometric detection circuit consists of sensitive bolometers and baseline resistances produced on the substrate or CMOS circuit (1).

FIG. 6A: Deposit and etch metallic layer (6) designed to fulfil reflector and connector component functions.

FIG. 6B: Apply a 0.2 to 0.5 µm thick sacrificial layer (polyimide) on reflector (6), and then open the latter in order to establish contact between lower electrodes (4) of the bolometer and substrate (1). Then deposit and etch lower electrode (4), part of which is also used as a bolometer connection and retention structure.

FIG. 6C: Apply a 2 µm to 2.3 µm thick sacrificial layer. Etch vertical cuts in the sacrificial layer (polyimide). Lower electrode (4) used as an etch-barrier layer for the sacrificial layer. A compensating mask may be required in order to control the etch profile. This mask is removed before depositing the following film.

FIG. 6D: Deposit thermometric bolometric material (2). The deposited material must have good step coverage. Deposition is preferably obtained by using a chemical process, e.g. Plasma Enhanced Chemical Vapour Deposition (PECVD).

FIG. 6E: Apply an organic layer (resin or polyimide) in preparation for mechanical chemical polishing.

FIG. 6F: Mechanical chemical polishing of surface parallel to substrate (1) of thermometric material (2).

Figure 6G:
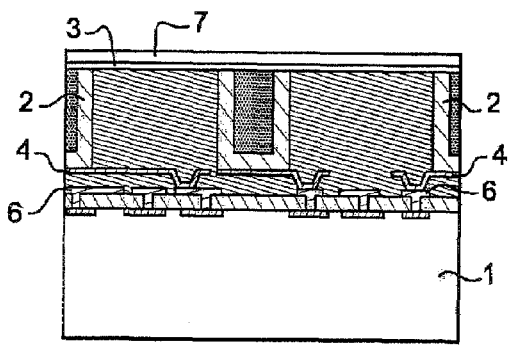
FIG. 6 is a schematic view of the various stages involved in simultaneously fabricating a bolometer and a baseline resistor.

FIG. 6G: Deposit a layer of TiN (30 to 100 Å) constituting upper electrode (3) and aluminium compensating mask (7).

Figure 6H:
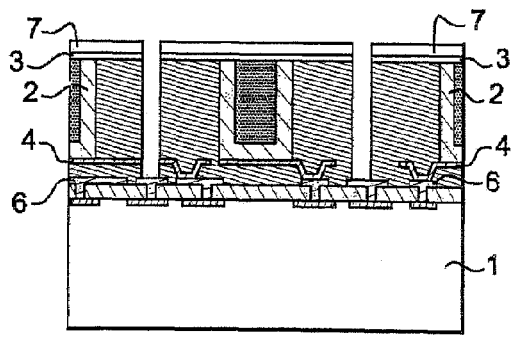

FIG. 6H: Etch contact opening in the sacrificial layer.

Figure 6I:
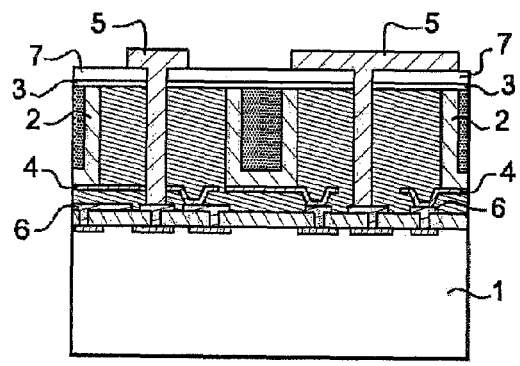

FIG. 6I: Deposit etching of metallization (Ti, TiN, WSi) (5) ensuring connection of upper electrode (3) to substrate (1).

Figure 6J:
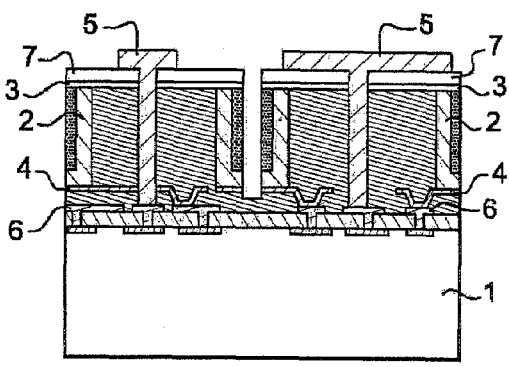

FIG. 6J: Use aluminium compensating mask (7) to reticulate the detectors.

Figure 6K:
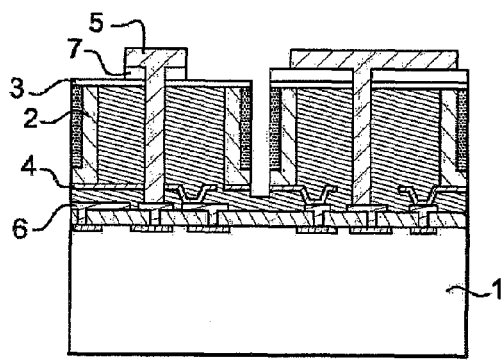

FIG. 6K: Etch compensating mask (7) on active detectors, then define upper electrode on them which is also used as absorber (3).

Figure 6L:
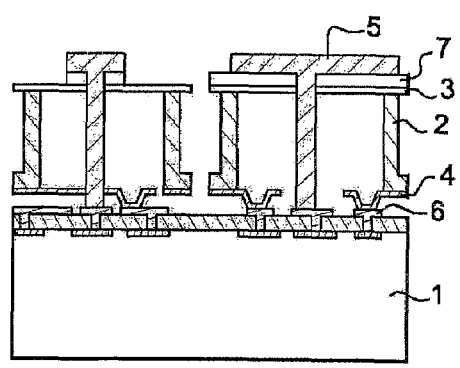

FIG. 6L: Release active detectors and baseline resistances by etching sacrificial layers.

The detector according to the invention preferably comprises an array architecture in order to perform infrared imaging.

The use of thin-film microstructures makes it possible to effectively thermally isolate the array of detectors from readout circuit (1). These microstructures can be prepared, for instance, by using various processes for fabricating microbridges.

The thermometer is made of a thin film (0.005 µm to 1 µm) of amorphous or polycrystalline semiconductor material (Si, Ge, SiC, a-Si:H, a-SiC:H, a-SiGe:H, ferrite, vanadium oxides, etc.). These layers are obtained using low-temperature deposition techniques which are customarily used for these materials: cathode sputtering, Low Pressure Chemical Vapour Deposition (LPCVD) or Plasma Enhanced Chemical Vapour Deposition (PECVD).

Any doping of these layers is obtained by introducing a dopant gas (BF3, PH3, etc.) into the reactor or by ion implantation. These materials are generally etched using plasma-assisted chemical etching processes.

The metallic materials (Ti, TiN, Pt, Al, Pd, Ni, NiCr, etc.) which constitute the electrodes and the various metallization areas are also deposited by cathode sputtering, LPCVD or PECVD. These metallized areas are defined by chemical or plasma etching processes or by a process known as "lift off". The thickness of these layers ranges from 0.005 µm to 1 µm.

The solution recommended by the present invention has a certain number of advantages compared with detectors according to the prior art.

The first advantage is the optimized optical absorption and optimized thermal isolation of these detectors which is inherent in releasing the effective detection surface to the benefit of the absorber.

The possibility of improving the optical resolution by possibly reducing the pitch spacing of said detectors, i.e. the pitch of the detection arrays which use them and the consequent possibility of increasing the fill factor due to the special architecture proposed, especially the dimensional features of the thermal isolation arms which are located at two levels.

Finally, optimization of the detector in accordance with the invention in terms of thermal mass should also be noted—all the thermometric material is active thanks to the contact established on the sheet of this material.

The invention claimed is:

1. A thermal detector for electromagnetic radiation comprising:
   a sensitive material, one electrical property of which varies with temperature;
   an electromagnetic radiation absorber which is in contact with said sensitive material;
   a substrate providing the function of support;
   electrically conductive elements providing electrical continuity between the sensitive material and the substrate;
   wherein
   the sensitive material is wholly or partly in the form of a sheet extending in a direction which is substantially perpendicular to the plane that bounds the substrate;
   the sensitive material is suspended by the absorber above the substrate, said absorber being fixed to the sensitive material in the upper region of the sheet; and
   the absorber is itself suspended by fixing means which is mechanically connected to the substrate.

2. A thermal detector for electromagnetic radiation as claimed in claim 1, wherein the sensitive material has resistivity which varies with temperature and consists of a bolometric material.

3. A thermal detector for electromagnetic radiation as claimed in claim 2, wherein the sensitive material consists of a semiconductor material selected from the group consisting of p- or n-type polycrystalline or amorphous silicon, p- or n-type polycrystalline or amorphous germanium, alloys thereof, vanadium oxides and ferrites.

4. A thermal detector for electromagnetic radiation as claimed in claim 1, wherein the absorber is in the form of layer located in a plane substantially parallel to that of the substrate.

5. A thermal detector for electromagnetic radiation as claimed in claim 1, wherein the sensitive material has a continuous or discontinuous cylindrical surface.

6. A thermal detector for electromagnetic radiation as claimed in claim 5, wherein the base of the cylindrical surface of sensitive material has a square, rectangular, circular or hexagonal shape.

7. A thermal detector for electromagnetic radiation as claimed in claim 1, wherein the detector comprises a reflective layer which reflects electromagnetic radiation, is electrically conductive and is located in a plane substantially parallel to the absorber.

8. A thermal detector for electromagnetic radiation as claimed in claim 7, wherein contact between lower electrodes, which are in contact with the sensitive material, and the substrate or reflective layer is ensured by means of mechanical or electrical connections.

9. A thermal detector for electromagnetic radiation as claimed in claim 7, wherein electric conduction between the lower electrodes which are in contact with the sensitive material and the substrate or reflective layer is ensured by capacitive coupling.

10. A thermal detector for electromagnetic radiation as claimed in claim 9, wherein:
the sensitive material is in the form of a continuous sheet;
the fixing means is electrically conductive and is mechanically and electrically connected to the substrate; and
the capacitive coupling is ensured between a conductive part attached to the sensitive material in the lower area of the sheet and a conductive part in the form of a conductive metallic layer located on the substrate.

11. A thermal detector for electromagnetic radiation as claimed in claim 9, wherein:
the sensitive material is in the form of a sheet consisting of two parts which are electrically insulated from other and extend in a direction which is substantially perpendicular to the plane that bounds the substrate;
the fixing means is electrically insulating and is mechanically connected to the substrate; and
the capacitive coupling is ensured between two conductive parts which are attached respectively to the sensitive material in the lower area of each of the two parts which constitute it, and two conductive parts each in the form of a conductive metallic layer located on the substrate.

12. A thermal detector for electromagnetic radiation as claimed in claim 1, wherein the fixing means consists of an electrically conductive post arranged at a right angle relative to the plane which bounds the substrate, there being electrical continuity between the top of the post and the absorber.

13. A thermal detector for electromagnetic radiation as claimed in claim 1, wherein the detector consists of a p/n junction.

14. A device for detecting infrared radiation including at least one thermal detector as claimed in claim 1.

15. A device for detecting infrared radiation as claimed in claim 14, wherein it has an array structure comprising at least two thermal detectors.

16. A device for detecting infrared radiation as claimed in claim 15, wherein it associates:
at least one active thermal detector; and
a reference thermal detector identical to the active detector, but without the ability to detect electromagnetic radiation.

17. A device for detecting infrared radiation as claimed in claim 16, wherein the inability of the reference detector to detect electromagnetic radiation is ensured by the fact that the top of the post that constitutes the fixing means entirely covers the surface of the absorber.

* * * * *